(12) United States Patent
Jeansonne et al.

(10) Patent No.: US 8,185,941 B2
(45) Date of Patent: May 22, 2012

(54) SYSTEM AND METHOD OF TAMPER-RESISTANT CONTROL

(75) Inventors: Jeffrey Kevin Jeansonne, Houston, TX (US); Wei Ze Liu, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1298 days.

(21) Appl. No.: 11/888,428

(22) Filed: Jul. 31, 2007

(65) Prior Publication Data

US 2009/0037749 A1 Feb. 5, 2009

(51) Int. Cl.
*H04L 29/06* (2006.01)
(52) U.S. Cl. .......................... 726/9; 713/193
(58) Field of Classification Search .............. 726/34, 726/9, 20; 713/189, 192, 193, 194
See application file for complete search history.

(56) References Cited

U.S. PATENT DOCUMENTS

| | | | |
|---|---|---|---|
| 6,415,324 B1* | 7/2002 | Cromer et al. | 709/229 |
| 7,155,305 B2 | 12/2006 | Hayes et al. | |
| 2003/0028633 A1* | 2/2003 | Lindsay et al. | 709/224 |
| 2003/0051013 A1 | 3/2003 | Anthony, Jr. et al. | |
| 2003/0097587 A1* | 5/2003 | Gulick | 713/200 |
| 2007/0011491 A1 | 1/2007 | Govindarajan et al. | |
| 2007/0150559 A1 | 6/2007 | Smith | |
| 2007/0156858 A1 | 7/2007 | Sood et al. | |
| 2007/0162955 A1* | 7/2007 | Zimmer et al. | 726/2 |
| 2007/0239990 A1* | 10/2007 | Fruhauf et al. | 713/185 |
| 2008/0244257 A1* | 10/2008 | Vaid et al. | 713/2 |

FOREIGN PATENT DOCUMENTS

| | | |
|---|---|---|
| EP | 1975836 | 10/2008 |
| KR | 1019990060725 A | 7/1999 |
| KR | 20020039046 A | 5/2002 |
| WO | WO2006/060078 | 6/2006 |

OTHER PUBLICATIONS

PCT International Search Report and Written Opinion in co-pending PCT International Application No. PCT/US2008/008358, International Filing Date of Jul. 7, 2008 and entitled "System and method of Tamper-Resistant Control" having a date of mailing of Jan. 15, 2009.
German Office Action, Appln. No. 112008002005.1, date of mailing Dec. 20, 2010, pp. 6.
Mirko Dölle: "Linux aufgeweckt: Zeit- und ereignisgesteuertes Starten des Rechners ersetzt den Dauerbetrieb", c't Nov. 2007 of May 14, 2007, pp. 206-211
Translation of German Office Action, Appln. No. 112008002005.1, date of mailing Dec. 20, 2010, pages 5.
Intellectual Property Office, Examination Report under Section 18(3), Appln No. 1001252.4, date of mailing Jul. 29, 2011, 4 p.
Intellectual Property Office, Examination Report under Section 18(3), Appn No. 1001252.4, date of mailing Nov. 25, 2011, 3 p.

* cited by examiner

*Primary Examiner* — Edward Zee

(57) ABSTRACT

A method of tamper-resistant control comprising reading a flag of an electronic device with firmware, the flag indicating a provision enable/disable state of the electronic device and provisioning a management processor of the electronic device to facilitate communications between the management processor and a server in response to reading the flag indicating a provision enable/disable state.

18 Claims, 2 Drawing Sheets

SYSTEM AND METHOD OF TAMPER-RESISTANT CONTROL

BACKGROUND

Networked electronic devices are configurable to be controlled from remote locations. For example, in some networked electronic devices, management processing chipsets can be utilized to provide remote access from a server to enable, for example, a system administrator to turn on, turn off, boot and/or otherwise operate the electronic device. However, the ability of an unauthorized third-party to access and gain control of such electronic devices increase unless numerous difficult and cumbersome set-up steps, operations and/or safeguards are conducted/implemented by the user/administrator of the networked electronic device.

DETAILED DESCRIPTION OF THE DRAWINGS

Figure 1:
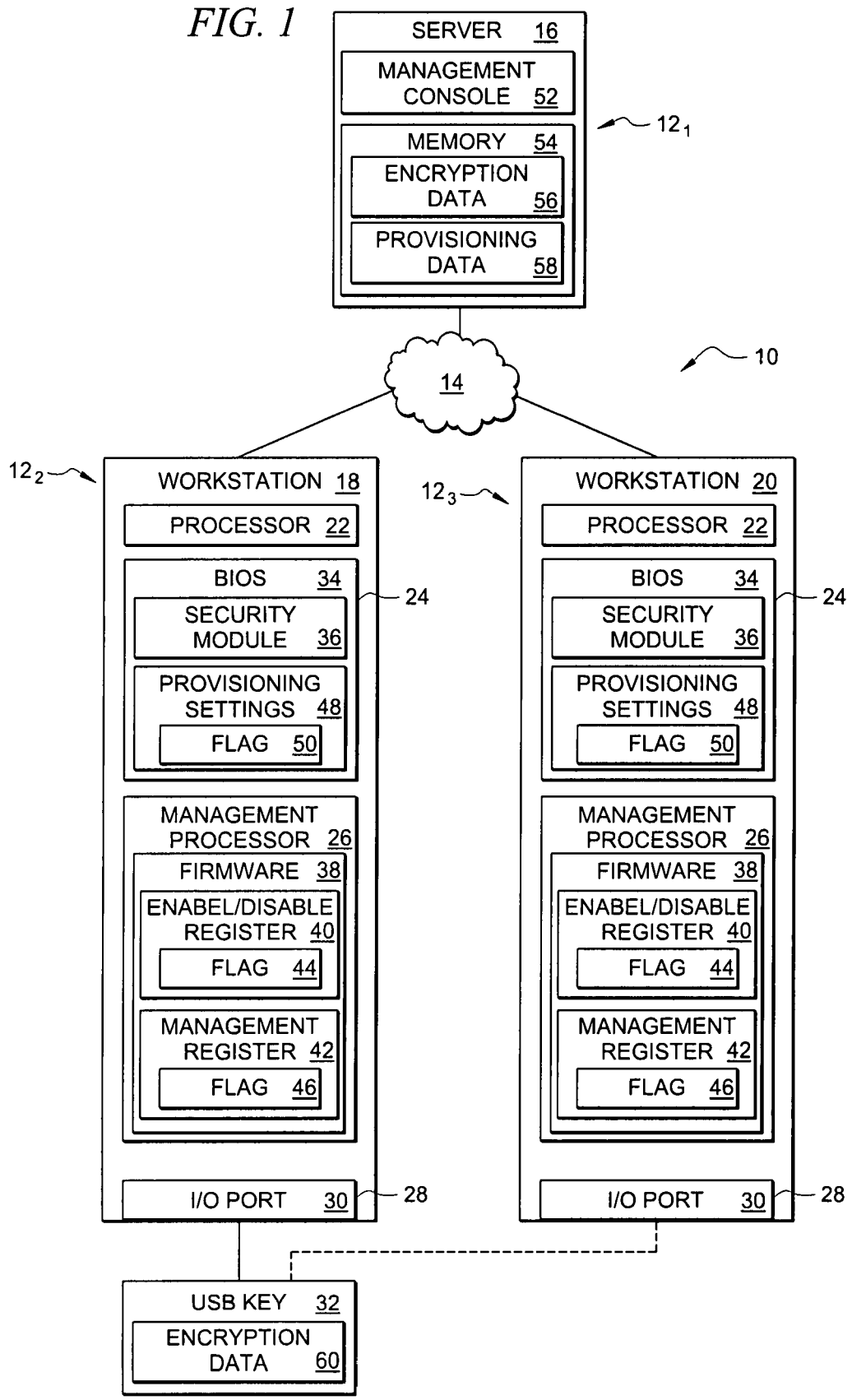
FIG. 1 is a block diagram of an embodiment of a tamper-resistant control system.

FIG. 1 is a diagram illustrating an embodiment of a tamper resistant control system 10. In the embodiment illustrated in FIG. 1, system 10 comprises one or more electronic devices $12_1$, $12_2$ and/or $12_3$ communicatively coupled via a communications network 14. In the embodiment illustrated in FIG. 1, three electronic devices $12_1$, $12_2$ and/or $12_3$ are illustrated; however, it should be understood that a greater or fewer number of electronic devices $12_1$, $12_2$ and/or $12_3$ may be used in connection with system 10. In the embodiment illustrated in FIG. 1, electronic devices $12_1$, $12_2$ and/or $12_3$ may comprise any type of electronic devices such as, but not limited to, desktop computers, portable notebook computers, convertible portable computers, tablet computers, gaming devices, workstations and/or servers. According to some embodiments, communication network 14 comprises a local area network; however, it should be understood that communications network 14 may be any type of wired and/or wireless communication network (e.g., the Internet, a cellular network, etc.) that enables communications between electronic devices $12_1$, $12_2$ and/or $12_3$.

In the embodiment illustrated in FIG. 1, electronic device $12_1$ comprises a server 16 and electronic devices $12_2$ and $12_3$ each comprise workstations 18 and 20, respectively, coupled to server 16 via communication network 14. In the embodiment illustrated in FIG. 1, electronic devices $12_2$ and $12_3$ comprise a processor 22, firmware 24, a management processor 26 and at least one input/output (I/O) port 28 such as, for example, a universal serial bus (USB) I/O port 30 to receive a USB key 32. In FIG. 1, firmware 24 is coupled to processor 22, management processor 26 and I/O port 28 and is configured to provide boot-up functionality for electronic devices $12_2$ and $12_3$. For example, in some embodiments, firmware 24 executes initial power-on instructions such as configuring processor 22 and causing processor 22 to begin executing instructions at a predetermined time. Firmware 24 may comprise a basic input/output system (BIOS) 34; however it should be understood that firmware 24 may comprise other systems or devices for providing boot-up functionality. In the embodiment illustrated in FIG. 1, BIOS 34 comprises a security module 36 to limit access to BIOS 34 (e.g., to users having a password). Security module 36 may comprise hardware, software, or a combination of hardware and software, and is used to verify or authenticate the identity of a user attempting to access BIOS 34.

In the embodiment illustrated in FIG. 1, management processor 26 is configured to facilitate remote access to electronic devices $12_2$ and $12_3$ via communications network 14. For example, in the embodiment illustrated in FIG. 1, management processor 26 of each electronic device $12_2$ and $12_3$ enables a network administrator utilizing electronic device $12_1$ to remotely access and control electronic devices $12_2$ and $12_3$ via communications network 14. For example, according to some embodiments, management processor 26 enables a user of electronic device $12_1$ to turn on, turn off, boot, and/or otherwise control electronic devices $12_2$ and/or $12_3$ remotely from electronic device $12_1$.

In the embodiment illustrated in FIG. 1, management processor 26 comprises firmware 38, an enable/disable register 40 and a management register 42. Registers 40 and 42 comprise information stored by management processor 26 associated with various preset and/or operating parameters of management processor 26 to enable provisioning of management processor 26. For example, the various preset and/or operating parameters of management processor 26 may be configured in the field prior to leaving the manufacturer of management processor 26. In FIG. 1, enable/disable register 40 comprises an enable/disable flag 44 stored in non-volatile memory thereof. Enable/disable flag 44 is used to indicate a setting for management processor 26 as either being enabled for use or disabled for non-use. For example, enable/disable flag 44 is used to indicate whether management processor 26 is enabled to facilitate communication with electronic device $12_1$. Thus, in some embodiments, if enable/disable flag 44 is set to "YES," the setting for management processor 26 comprises an enabled setting to enable communication between electronic device $12_1$ and electronic devices $12_2$ and $12_3$ via management processor 26. Correspondingly, if enable/disable flag 44 is set to "NO," the setting for management processor 26 comprises a disabled setting to otherwise disable management processor 26 to prevent use thereof. It should be understood that flag 44 may be otherwise set for indicating the enabled or disabled state of management processor 26.

Similarly, management register 42 comprises an none/AMT (active management technology) flag 46 stored in non-volatile memory thereof. None/AMT flag 46 is used to indicate a setting for management processor 26 as either being configured in an AMT mode or a non-AMT mode. For example, none/AMT flag 46 is used to indicate whether management processor 26 is enabled to facilitate communication with electronic device 12.sub.1. Thus, in some embodiments, if none/AMT flag 46 is set to "YES," the setting for management processor 26 comprises an enabled setting to enable communication between electronic device 12.sub.1 and electronic devices 12.sub.2 and 12.sub.3 via management processor 26. Correspondingly, if none/AMT flag 46 is set to "NO," the setting for management processor 26 comprises a disabled setting to otherwise disable management processor 26 to prevent use thereof. It should be understood that flag 46 may be otherwise set for indicating the enabled or disabled state of management processor 26. According to some embodiments, enable/disable register 40 and a management register 42 are set to "YES" such that management processor 26 is configured for provisioning. In the embodiment illustrated in FIG. 1, enable/disable flag 44 none/AMT flag 46 are both set to "YES."

In the embodiment illustrated in FIG. 1, BIOS 34 comprises a provisioning setting 48 to enable provisioning of management processor 26 for communication with electronic device $12_1$. In FIG. 1, provisioning setting 48 comprises a provisioning enable/disable flag 50 stored in non-volatile memory thereof. Provisioning enable/disable flag 50 is used to indicate a setting for BIOS 34 as either being enabled for provisioning (e.g., establishing access rights and privileges to ensure the security thereof management processor 26 (e.g., establishing access rights and privileges to ensure the security thereof or disabled to block and/or otherwise prohibit provisioning of management processor 26. For example, provisioning enable/disable flag 50 is used to indicate whether BIOS 24 is set to facilitate provisioning. Thus, in some embodiments, if provisioning enable/disable flag 50 is set to "YES," the setting for BIOS 24 comprises a provisioning setting to enable provisioning. Correspondingly, if provisioning enable/disable flag 50 is set to "NO," the setting for BIOS 24 comprises a disabled setting to prohibit and/or otherwise block provisioning of management processor 26, thereby preventing unauthorized access to management processor 26 and control of electronic devices $12_2$ and $12_3$. In the embodiment illustrated in FIG. 1, security module 36 prevents and/or substantially reduces the likelihood of an unauthorized party accessing BIOS 24 to modify and/or otherwise change provisioning setting 48. Accordingly, management processors 26 of each electronic device $12_2$ and $12_3$ remain locked (e.g., unable to be provisioned) until provisioning setting 48 in BIOS 24 is set to "YES" to prevent tampering and/or unauthorized provisioning.

In the embodiment illustrated in FIG. 1, electronic device $12_1$ comprises a management console 52 to enable and control communications via communication network 14 with electronic devices $12_2$ and/or $12_3$, respectively, once management processor(s) 26 has been provisioned for communication with electronic device $12_1$. For example, in the embodiment illustrated in FIG. 1, management console 52 enables a network administrator utilizing electronic device $12_1$ to remotely access and control electronic device $12_2$ and/or $12_3$ via communications network 14 through management processor 26. Thus, according to some embodiments, management console 52 and management processor 26 enable the network administrator to turn on, turn off, boot, and/or otherwise control electronic device $12_2$ and $12_3$ remotely from electronic device $12_1$.

In FIG. 1, electronic device $12_1$ comprises a memory 54 comprising an encryption key index 56 and provisioning data 58. According to some embodiments, encryption data 56 is configured to store encryption keys consisting of a unique key identifier, a corresponding machine identifier (e.g., an identifier to clearly identify each electronic device 12 communicatively coupled to server 16) and a password for electronic devices $12_2$ and $12_3$. In FIG. 1, encryption data 56 is storable on a storage device such as, for example, a USB key 32 as encryption data 60 for identifying and securing communications when provisioning electronic devices $12_2$ and $12_3$. In operation, USB key 32 coupleable to I/O port 28 and to enable management processor 26 to transmit encryption data 60 to electronic device $12_1$ for comparison with the data contained in encryption data 56 for authentication of electronic device $12_1$ prior to commencing provisioning of management processor 26. According to some embodiments, USB key 32 is also coupleable to I/O port 28 of electronic device $12_2$ for authentication prior to commencing provisioning of management processor 26 of electronic device $12_2$.

Figure 2:
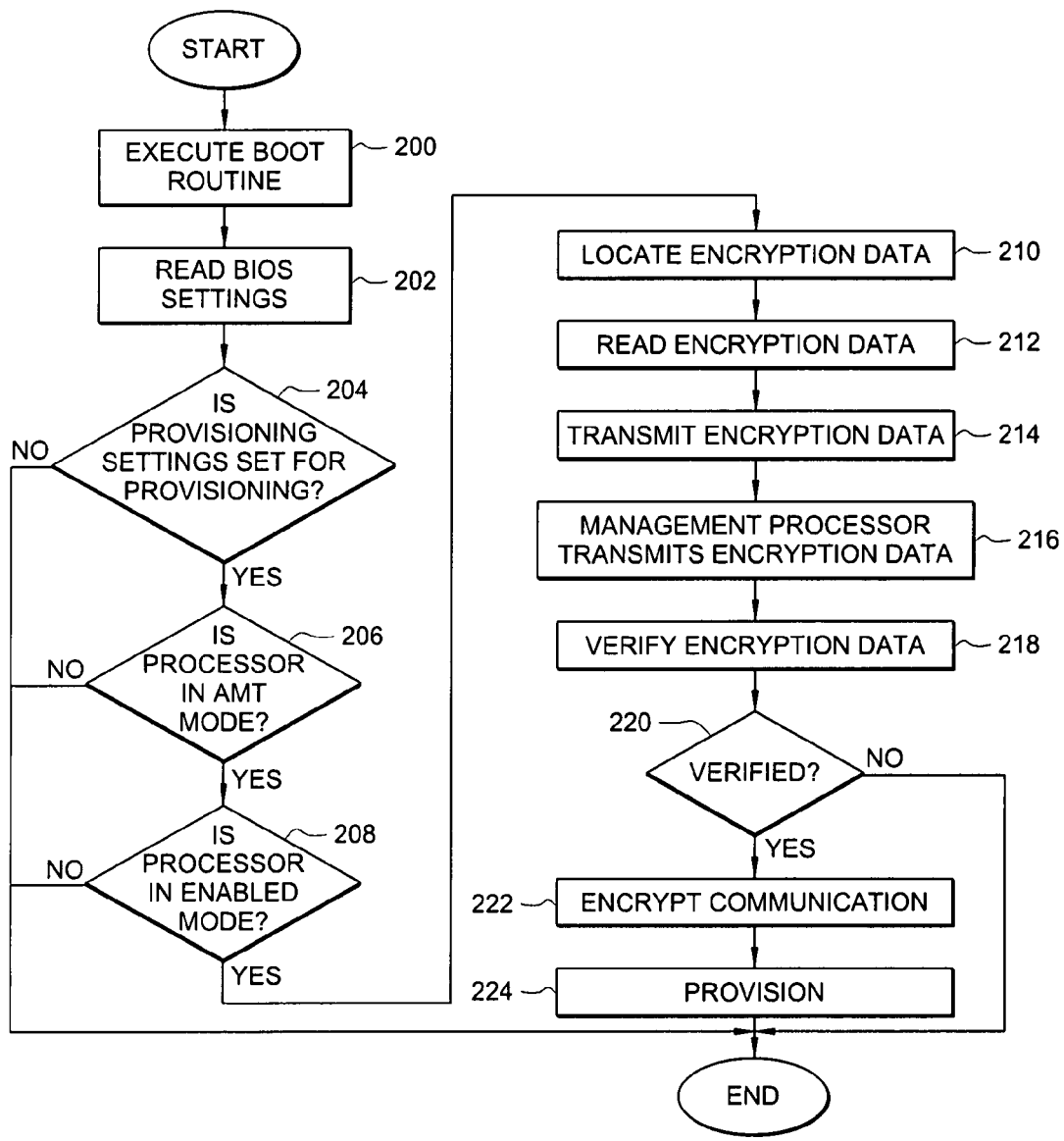
FIG. 2 is a flow diagram illustrating an embodiment of a tamper-resistant control method.

FIG. 2 is a flow diagram illustrating an embodiment of a tamper-resistant control method. In FIG. 2, the method begins at block 200 wherein BIOS 34 executes a boot routine (e.g., in response to a power-on or wake event). At block 202, BIOS 34 reads provisioning settings 48 in BIOS 34 to check flag 50 to determine whether system 10 is configured for provisioning.

If at decisional block 204 provisioning setting 48 is not set for provisioning (e.g., provisioning enable/disable flag 50 is set to "NO"), the method ends and management processor 26 cannot be provisioned. If however, at decisional block 204, provisioning setting 48 is set for provisioning (e.g., provisioning enable/disable flag 50 is set to "YES"), the method proceeds to decisional blocks 206 and 208 to determine whether management processor 26 is configured in the AMT mode and enabled mode, respectively. If at decisional block 206 or 208, processor 28 is not in the AMT mode or the enabled mode, the method ends. If at decisional blocks 206 and 208, management processor 26 is configured in the AMT mode and the enabled mode, respectively, the method proceeds to block 210 to enable to communicate with input/output port 28 to locate encryption data 60. For example, in FIG. 2, BIOS 34 searches all USB ports for USB key 32 coupled to electronic device 12. At block 210, BIOS 34 reads encryption data 60 to obtain the assigned password, key and machine identifier for the particular electronic device $12_2$ and/or $12_3$ that USB key 32 is coupled thereto. At block 214, BIOS 34 communicates the password, key and machine identifier to management processor 26 to enable management processor 26 to connect to electronic device $12_1$ via communications network 14. At block 216, management processor 26 transmits encryption data 60 to electronic device $12_1$ to ensure that encryption data 60 matches encryption data on electronic device $12_1$ (e.g., corresponding to encryption data 56), as indicated at block 218. If at decisional block 220 verification is successful, electronic device $12_1$ transmits an encryption certificate to electronic device $12_1$ to facilitate secure transmission of provisioning data 58 to provision management processor 26, as indicated in bocks 222 and 224. If at decisional block 220 verification is unsuccessful, the method ends.

Thus, embodiments of system 10 enable management processor 26 to be configured in an enabled mode prior to using and/or otherwise booting an electronic device 12. According to some embodiments, provisioning settings 48 in BIOS 24 secure and/or otherwise prevent unauthorized access to and provisioning of management processor 26.

What is claimed is:

1. A method of tamper-resistant control, comprising:
    reading at least one flag of an electronic device with firmware, the flag indicating a provisioning enable/disable state that indicates one of an enable state in which a management processor of the electronic device is enabled to communicate with a remote server and a disable state in which the management processor is disabled from communicating with the remote server;
    provisioning the management processor of the electronic device based on communications between the management processor and the remote server in response to reading the flag indicating the enable state;
    configuring the management processor to enable the remote server to remotely access and control the electronic device via a console at the remote server,
    reading an input/output port of the electronic device to locate encryption data; and
    transmitting the encryption data from the electronic device to the remote server to authenticate the remote server to communicate with the electronic device.

2. The method of claim 1, wherein reading the flag is performed when a basic input/output system (BIOS) of the electronic device executes a boot routine in response to a power-on or wake event of the electronic device.

3. The method of claim 1,
wherein reading the input/output port comprises reading a universal serial bus (USB) port of the electronic device to locate the encryption data stored in a USB key.

4. The method of claim 1, further comprising provisioning the management processor in response to determining a state of an AMT (active management technology) flag in the management processor.

5. The method of claim 1, wherein the management processor remains locked and unable to be provisioned by the remote server until a flag in a basic input/output system (BIOS) of the electronic device is set to authorize the management processor to be provisioned.

6. The method of claim 1, further comprising setting a block in firmware to prevent access to management processor firmware.

7. The method of claim 1, wherein provisioning the management processor comprises receiving provisioning data from the remote server and using the provisioning data to provision the management processor.

8. The method of claim 1, wherein the flag of the electronic device is located in a basic input/output system (BIOS) of the electronic device and read when the electronic device boots.

9. A non-transitory computer-readable medium having stored thereon an instruction set to be executed, the instruction set, when executed by a processor of an electronic device, causes the processor to:
read at least one flag, the flag indicating a provision enable/disable state that indicates one of an enable state in which a management processor of the electronic device is enabled to communicate with a remote server and a disable state in which the management processor is disabled from communicating with the remote server;
connect to the remote server to provision the management processor, wherein the remote server is to remotely control the electronic device once the management processor is provisioned for communication with the remote server;
read a universal serial bus (USB) port of the electronic device to locate encryption data stored in a USB key; and
transmit the encryption data to the remote server to match the encryption data to encryption data at the remote server.

10. The non-transitory computer readable medium of claim 9, wherein the instruction set, when executed by the processor, causes the processor to:
read the flag with a basic input/output system (BIOS) of the electronic device when the BIOS executes a boot routine in response to a power-on or wake event.

11. A non-transitory computer readable medium having stored thereon an instruction set to be executed, the instruction set, when executed by a processor of an electronic device, causes the processor to:
read at least one flag, the flag indicating one of an enable state in which a management processor of the electronic device is enabled to communicate with a remote server and a disable state in which the management processor is disabled from communicating with the remote server;
connect to the remote server to provision the management processor, in response to the flag indicating the enable state;
search ports of the electronic device for a removable storage device;
read encryption data from the removable storage device connected to one of the ports; and
transmit the encryption data to the remote server to ensure that the encryption data matches encryption data stored on the remote server in order to verify the electronic device for communicating with the remote server.

12. An electronic device comprising:
a management processor having a flag for indicating one of an enable state in which the management processor is enabled to communicate with a remote server, and a disable state in which the management processor is disabled from communicating with the remote server;
firmware to perform a procedure to provision the management processor in response to reading the flag indicating the enable state; and
an input/output port to facilitate access to encryption data stored in a storage device in response to detecting that the flag has the enable state, wherein the management processor is to send the encryption data to the remote server to match the encryption data to encryption data at the remote server.

13. The electronic device of claim 12, wherein the firmware further includes a flag that has a first state to enable provisioning of the management processor, and a second state to block provisioning of the management processor, and wherein the firmware is to check that the flag in the firmware has the first state prior to checking whether the flag in the management processor has the enable state or disable state.

14. The electronic device of claim 12, wherein the input/output port includes a universal serial bus (USB) port.

15. The electronic device of claim 12, wherein the encryption data comprises an electronic device identification and a password.

16. The electronic device of claim 12, wherein the management processor is to receive provisioning data from the remote server to provision the management processor.

17. The electronic device of claim 12, wherein the flag indicates an AMT (active management technology) state.

18. The electronic device of claim 12, wherein the firmware comprises a block to prevent access to management processor firmware.

* * * * *

UNITED STATES PATENT AND TRADEMARK OFFICE
CERTIFICATE OF CORRECTION

| | | |
|---|---|---|
| PATENT NO. | : 8,185,941 B2 | Page 1 of 1 |
| APPLICATION NO. | : 11/888428 | |
| DATED | : May 22, 2012 | |
| INVENTOR(S) | : Jeffrey Kevin Jeansonne et al. | |

It is certified that error appears in the above-identified patent and that said Letters Patent is hereby corrected as shown below:

In column 4, line 58, in Claim 1, delete "server," and insert -- server; --, therefor.

Signed and Sealed this
Fourth Day of December, 2012

David J. Kappos
*Director of the United States Patent and Trademark Office*